United States Patent [19]

Prince et al.

[11] Patent Number: 4,533,197
[45] Date of Patent: Aug. 6, 1985

[54] JUNCTION BLOCK FOR SHIELDED COMMUNICATIONS NETWORK LINE

[76] Inventors: Thomas F. Prince, 1175 Brook Rd., Milton, Mass. 02186; Julian J. Bishop, 31 Beech St., Belmont, Mass. 02188

[21] Appl. No.: 495,831
[22] Filed: May 18, 1983
[51] Int. Cl.³ .............................................. H01R 4/02
[52] U.S. Cl. ............................ 339/97 R; 339/177 R; 339/198 R
[58] Field of Search ................ 339/97 R, 97 P, 98, 339/99 R, 177 R, 177 E, 14 R, 14 P, 96, 198 R, 176 MF

[56] References Cited

U.S. PATENT DOCUMENTS

| | | | |
|---|---|---|---|
| 2,745,065 | 5/1956 | Maher | 339/99 R |
| 3,083,349 | 3/1963 | Blonder | 339/98 |
| 3,167,375 | 1/1965 | Sarazen | 339/99 R |
| 3,597,726 | 8/1971 | Appleton | 339/19 |
| 3,836,943 | 9/1974 | Horak | 339/177 R |
| 4,365,856 | 12/1982 | Yaegashi et al. | 339/176 MF |

FOREIGN PATENT DOCUMENTS 1765202  7/1971  Fed. Rep. of Germany .... 339/97 P

*Primary Examiner*—Gil Weidenfeld
*Assistant Examiner*—David L. Pirlot
*Attorney, Agent, or Firm*—Sylvia L. Boyd; H. Eugene Stubbs

[57] ABSTRACT

A device for connecting shielded pair has a base holding a shield bus and two conductor buses. Each bus is formed from sheet metal stock and positioned to provide a wall at right angle to the floor of the base. The buses have insulation displacement slots situated away from the floor of the base. The base and a cover cooperatively form line entrance structures which are aligned with the slots in the shield bus and resist rotating of the lines. The cover has structures which retain the conductors in place. The base has structures supporting the shield bus in proximity to the displacement slots.

12 Claims, 11 Drawing Figures

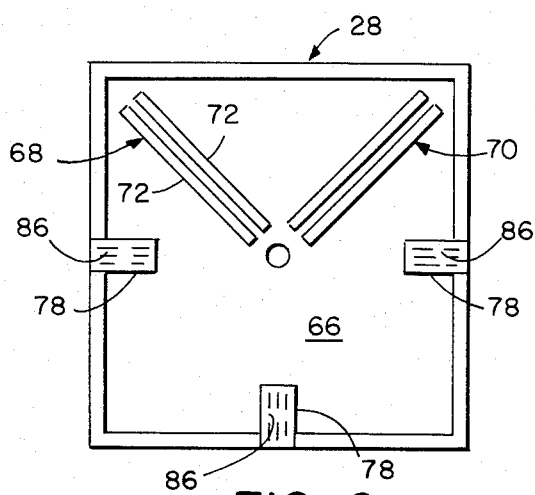
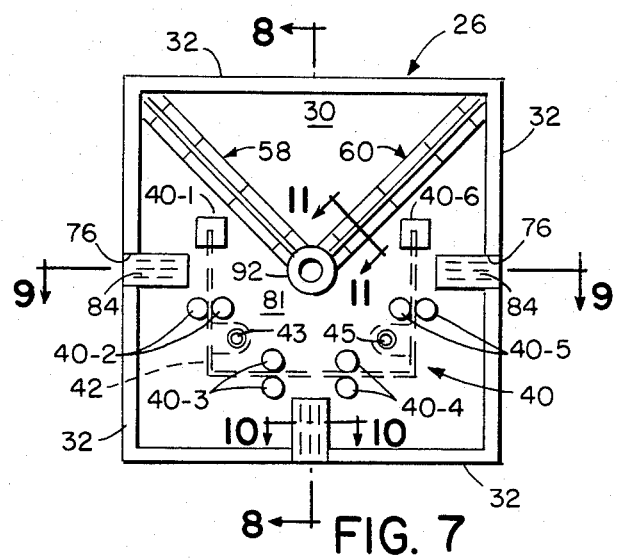
FIG. 6
FIG. 7
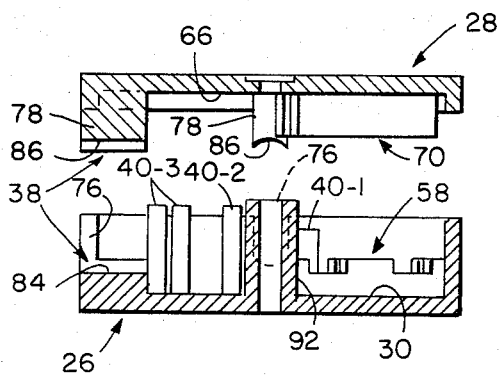
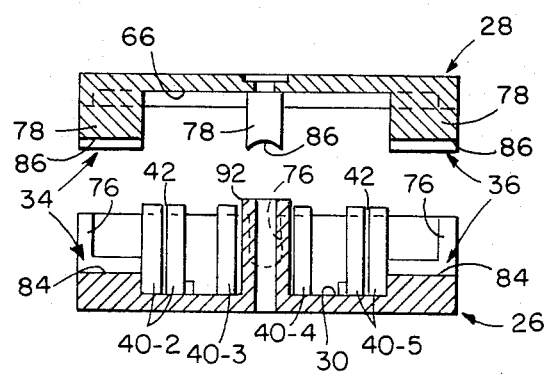
FIG. 8
FIG. 9
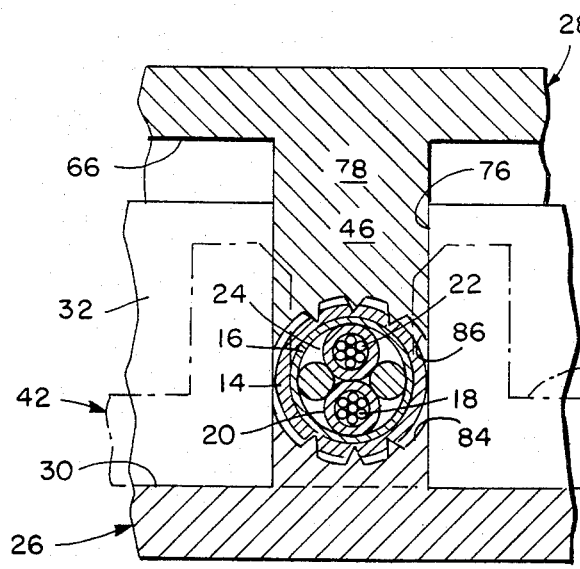
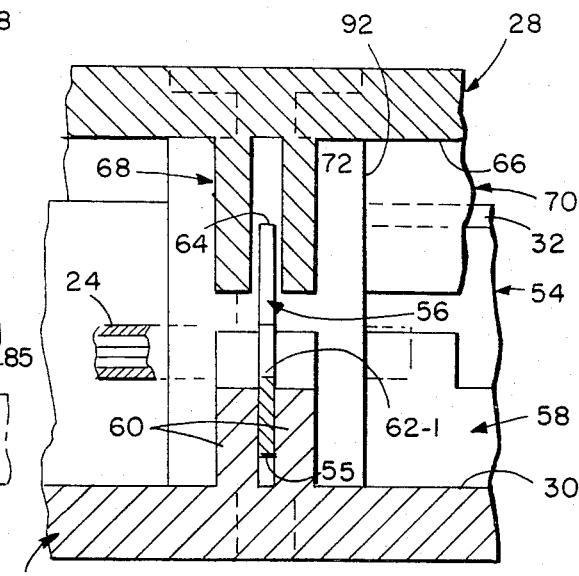
FIG. 10
FIG. 11

JUNCTION BLOCK FOR SHIELDED COMMUNICATIONS NETWORK LINE

BACKGROUND OF THE INVENTION

This invention relates to communications networks, particularly local area networks connecting office data processing equipment. In particular, it relates to a junction block for providing a splice-in connection such as a T-connection to a communication line requiring the use of shielded line because of the frequencies employed. Communication lines of the type concerned may comprise shielded twisted pair, coaxial cable, or shielded wire containing more than two conductors, among other types.

In the rapidly growing field of office automation, using electronic data processing equipment, there is a growing use of local area networks, serving, for example, a single office building or portion of a building. In such networks, there is increasing use of twisted-pair wire as the communications line. Frequently, when the network is installed in the building, such wire is strung through the building, for example, above the ceiling, and lines are dropped from the continuous line to floor level for the connection of equipment into the line. The drop line is typically terminated in a receptacle for a plug from the equipment to be connected into the line.

Prior art devices for such connection have had various disadvantages. Most significantly, such devices have been extremely expensive. For example, a method for connection that has been commonly used has involved terminating each arm of the T connection in a twin axial plug, each plug being then connected to the receptacle of a specially designed block. In addition to the cost of fabrication, such connections are obviously time-consuming to make, and require a high level of expertise. When the connector is employed in multiples in the course of wiring an entire building, the expense of manufacture and installation becomes significant.

It is therefore an object of this invention to provide a junction block for use with shielded two-conductor line or the like that is less expensive than prior art devices, both in production cost and in installation cost. It is a further object to provide such a junction block that can be installed without removal of the insulation of the inner conductors, or the individual preparation of such conductors, and that can be installed without special preparation of the shield, such as combing and pigtailing. Further, it is an object to provide such a junction block that can be used either in an intermediate or an end position on the line (as either a T-connection or an L-connection) or simply as a splice. It is a further object to provide such a block that is resistant to degrading the connection by exterior twisting forces on the network line. Finally, it is particularly an object to provide such a block which meets FCC requirements of limitations on noise generated from the block.

According to the invention, a junction block provides splice-in connection to a network line comprising an outer insulation, a shield, and at least two conductors, each conductor being separately enclosed in an insulation layer. The junction block comprises a base and cover mutually engageable to define a junction block body in an assembled condition. The block in its assembled condition provides at least two line-entrance structures connecting the interior and exterior of the block body. The base has an interior floor and perimeter wall portions; the base floor provides first bus receiving means and conductor bus receiving means. The block further comprises an electrically conductive shield bus positioned in the first bus receiving means, and providing a plurality of major slots, each major slot being aligned with a line-entrance structure. Each major slot is sized to displace the outer insulation and engage the shield of a network line.

The block further comprises electrically conductive conductor buses each positioned in the conductor bus receiving means and having an upper edge spaced from the receiving means, and providing at least one slot opening from the upper edge, each slot being sized to displace the inner insulation and engage the conductor of a network line.

The cover has an inner surface, providing conductor keepers, generally aligned with the conductor buses in the assembled condition of the block, each conductor keeper extending towards the base floor by a distance less than the depth of the conductor bus slots.

In preferred embodiments, the junction block has three line-entrance structures, two of them being generally aligned. The shield bus is generally U-shaped, comprising two leg portions each adjacent one of the generally aligned line-entrance structures, and an included portion adjacent the remaining line-entrance structure; the portions are of generally equal length, each providing one of the shield bus major slots. The shield bus major slots extend vertically away from the base floor; the conductor bus slots also extend vertically away from the base floor. The base provides three network line receiving slots, and the block cover provides three corresponding line retaining legs; a retaining leg is received in a receiving slot in the block assembled condition to comprise a line entrance structure. The retaining legs together with the line receiving slots together define a polarized assembled position of the cover with respect to the base.

The line receiving slots each provide a plurality of ridges oriented parallel with the extent of the line-entrance structure, and the retaining legs provide a plurality of ridges similarly oriented; the slot ridges and leg ridges together comprise line rotation-limiting structure.

The U-shaped shield bus defines an area parallel with the plane of the base floor, effectively enclosed within the shield bus, the two inner conductor buses being positioned in the base conductor bus receiving means to define a point of closest approach between the conductor buses; the point of closest approach is within the effectively enclosed area.

Preferably, in the assembled condition of the block, the junction block body has an axis of symmetry in a plane parallel with the base floor, and the two aligned line-entrance structures are positioned symmetrically with respect to the axis of symmetry; the bus shield portions are positioned symmetrically with respect to the axis of symmetry, and the conductor buses are positioned symmetrically with respect to the axis of symmetry.

Other objects, features and advantages will appear from the following description of a preferred embodiment, together with the drawing, in which.

Figure 2:
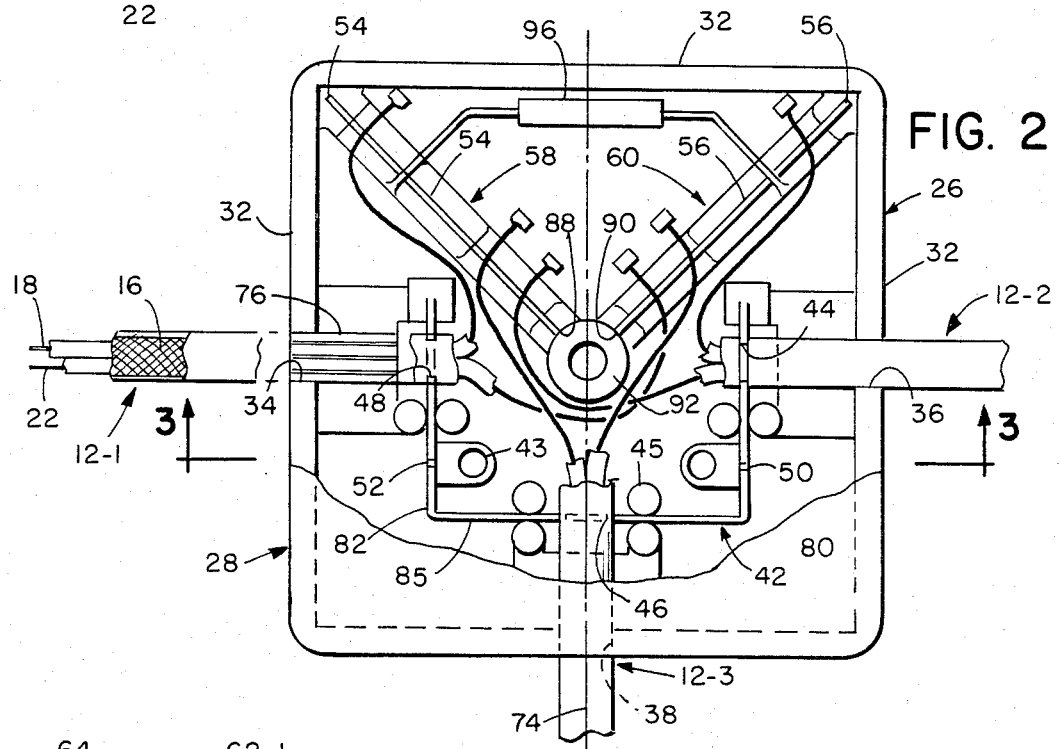
FIG. 2 is a plan view of the junction block in assembled condition, showing the interior of the base and other portions.
Figures 4, 5:
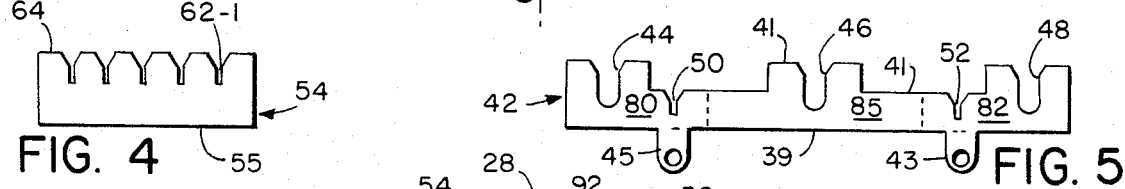
Figure 3:
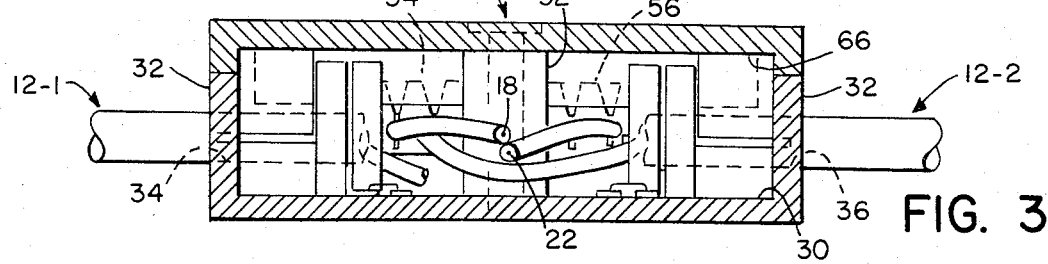

FIG. 3 is a section taken on lines 3—3 of FIG. 2;
FIGS. 4 and 5 show the junction block buses;
FIG. 6 is a view of the interior of the block cover;
FIG. 7 is a view of the interior of the block base;
FIG. 8 is a section taken on line 8—8 of FIG. 7, but with cover and base slightly separated for clarity;
FIG. 9 is a section taken on line 9—9 of FIG. 7, but with cover and base slightly separated for clarity;
FIG. 10 is a section taken on line 10—10 of FIG. 7; and
FIG. 11 is a section taken on line 11—11 of FIG. 7.

DESCRIPTION OF THE PREFERRED EMBODIMENT

Figure 1:
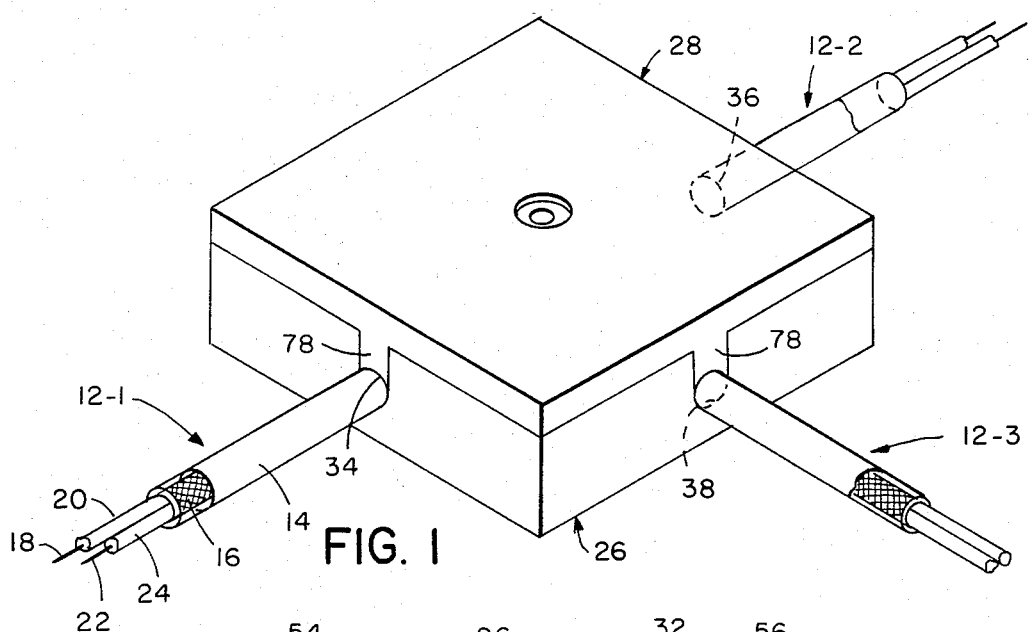
FIG. 1 is a view of the exterior of the junction block of the invention in assembled condition.

Referring now to the drawing, and in particular to FIG. 1, in a preferred embodiment the junction block 10 of the invention provides a T-connection to a communication line. (Other configurations such as an L-connection or a four port connection can be provided, by appropriate modifications of the junction block described.) The network line 12 described herein comprises an outer insulation 14, a shield 16 within the outer insulation, and at least two conductors 18 and 22, each conductor being separately enclosed in an insulation layer 20 or 24, and carried within shield 16. Shield 16 may be a conductive braid or foil. A network line of shielded twisted pair, coaxial cable, or of other similar type, may also be used with the junction block of the invention.

Block 10 comprises a base 26 and cover 28, mutually engageable to define junction block body 10 in an assembled condition. In the assembled condition of block 10, the block provides at least two, and in a preferred embodiment three, line-entrance structures connecting the interior and exterior of block 10. In the embodiment shown in FIG. 1, structures 34 and 36 are generally aligned, and admit sections of the main network line (12-1 and 12-2), while structure 38 admits the drop line (12-3).

Referring now to FIG. 7, base 26 has an interior floor 30 and perimeter wall portions 32. Base floor 30 provides first bus receiving means 40 comprising elements 40-1, 40-2, 40-3, 40-4, 40-5, and 40-6. An electrically conductive shield bus 42 is positioned generally vertically with respect to base floor 30 in first bus receiving means 40, and is heat-staked to base floor 30 at elements 43 and 45. In the preferred embodiment, bus 42 is U-shaped as seen in, for example, FIGS. 2 or 7, and comprises two leg portions 80 and 82 and an included portion 85 between them, portions 80, 82 and 85 being of generally equal length. In the assembled condition of block 10, shield bus portions 80, 82 and 85 together define a generally rectangular area 41, in the plane of floor 30, effectively enclosed within bus 42, but open on its fourth side (along a line connecting means 40-1 and 40-6).

Bus 42 is seen in unfolded form in FIG. 5, the fold lines being indicated by dashed lines.

Bus 42 has a lower edge 39 and an upper edge 41 of uneven height, and in the preferred embodiment provides three major slots 44, 46, and 48 in the taller portions of bus 42, and two minor slots 50 and 52 in the shorter portions, all opening from upper edge 41. Each bus portion (80, 82, 85) provides one of the major slots 44, 46, 48. When the lower edge 39 of bus 42 is positioned in bus receiving means 40, each major slot is aligned with a line-entrance structure and extends generally vertically away from base floor 30, as seen, for example, in FIG. 10. Thus major slot 48 is aligned with line-entrance structure 34; major slot 44 is aligned with line-entrance structure 36; major slot 46 is aligned with line-entrance structure 38. Each major slot is sized to displace the outer insulation 14 and engage the shield 16 of a network line.

In the preferred embodiment, in the assembled condition of the junction block, shield bus receiving means components 40-1 and 40-2 are adjacent major slot 48, shield bus receiving means components 40-3 and 40-4 are adjacent major slot 46, and shield bus receiving means components 40-6 and 40-5 are adjacent major slot 44. All the receiving means components extend upwardly from base floor 30 and are of a height generally equal to that of the shield bus at a major slot. By this means, support is provided to bus 42 particularly at the major slots, stiffening bus 42 for the insulation displacement process. Considerable force is required to penetrate the insulation 14 of a network line of the kind described. The described bus receiving means structure makes possible the use of a lighter stock than otherwise could be employed. In a preferred embodiment, a phosphor bronze stock 20/1000 inch thick has been used. The described configuration of the shield bus, being taller adjacent the major slots and shorter adjacent the minor slots, can be used because of the advantageous support provided by the first bus receiving means, and by reducing the quantity of metal employed in the junction block reduces its cost, without degrading the quality of the connection achieved.

Means 40 is spaced inwardly of perimeter wall portions 32, thereby providing room for the placement of resistors, as will be described.

Base floor 30 further provides conductor bus receiving means. In the preferred embodiment, adapted for use with a two-conductor network line, there are two conductor buses 54 and 56 (FIG. 2). Conductor bus 54 is seen in FIG. 4 by way of example; conductor bus 56 is identical to it. Each of conductor buses 54 and 56 has a lower edge 55 and an upper edge 64, and provides at least one slot 62 opening from upper edge 64. In the preferred embodiment, five slots 62 are provided. Each slot 62 is sized to displace the inner insulation 20 or 24 and engage the conductor 18 or 22 of a network line.

In the assembled condition of block 10, lower edge 55 of conductor bus 54 is positioned in conductor bus receiving means 58 of base 26; lower edge 55 of conductor bus 56 is positioned in conductor bus receiving means 60 (FIG. 2 or FIG. 7). The conductor buses are retained in the bus receiving means by an interference fit. Means 58 and 60 are so positioned as to place conductor buses 54 and 56 in close proximity to shield bus 42 in the assembled condition of the junction block. Such an arrangement is effective to minimize electrical noise generation from the junction in the network line.

Further, conductor bus receiving means 58 and 60 preferably receive buses 54 and 56 in such a manner that the bus lower edges 55 are spaced inwardly from the inner surface of base floor 30. By this means, should it be desirable in a particular application of the junction block of the invention, an additional conductive shield plate (not shown) can be placed adjacent the inner surface of floor 30, in electrical contact with shield bus 42, while buses 54 and 56 are spaced from it, maintaining electrical isolation between the conductor buses and the shield plate.

In the preferred embodiment, shield bus 42 and conductor buses 54 and 56 are symmetrically placed with respect to a line of symmetry, indicated by the dashed line 74 (FIG. 2). In particular, each of buses 54 and 56 is positioned at the same distance from shield bus 42 and in the same orientation with respect to it. Further, conductor buses 54 and 56 are placed adjacent the open fourth side of area 81 effectively enclosed by shield bus 42.

In the preferred embodiment, the two conductor buses 54 and 56 are oriented by means 58 and 60 to define a "V", the point of the V being a continuation of the lines of the buses, which do not, of course, make contact with one another. The ends 88 and 90 of buses 54 and 56 are the portions of the buses that approach one another most closely. Accordingly, the electric field between buses 54 and 56 is strongest adjacent ends 88 and 90, and is less strong away from these ends. According to a preferred embodiment of the invention, at least the ends 88 and 90 of buses 54 and 56 are placed within area 81 effectively enclosed by shield bus 42. Such an arrangement tends desirably to limit the radiation of electrical energy from the junction block.

Referring now particularly to FIG. 6, cover 28 has an inner surface 66, and provides on inner surface 66 conductor keepers 68 and 70. In the assembled condition of the junction block, conductor keeper 68 is generally aligned with conductor bus 56, and conductor keeper 70 is generally aligned with conductor bus 54. In a preferred embodiment, each conductor keeper comprises two extended parallel bosses, spaced apart to permit the conductor bus upper edge 64 to be placed between them; the bosses extend towards base floor 30 by a distance less than the depth of a slot 62.

In the preferred embodiment, block base 26 provides three network line receiving slots 76, extending from base perimeter wall 32 inwardly. Block cover 28 provides for each slot 76 a corresponding network line retaining leg 78, extending, as most clearly seen in FIG. 10, downwardly from cover 28 and received in the corresponding slot 76 in the block assembled condition to comprise one of the line-entrance structures 34, 36 or 38. Legs 78 and slots 76 together define a polarized assembled position of cover 28 with respect to base 30. Preferably, as seen in FIG. 10, slot 76 provides a surface 84 concave away from base floor 30, while leg 78 provides a surface 86 concave away from cover 28. Each of surfaces 84 and 86 provide a plurality of ridges 94 oriented parallel with the direction of extension of the line-entrance structure from exterior to interior of block 10; in the assembled condition of the block, ridges 94 engage the outer insulation 14 of the network line, as seen in FIG. 10, and limit or prevent its rotation within the line-entrance structure. Ridges 94 of surfaces 84 and 86 together comprise line rotation-limiting structure. Such structure advantageously reduces the possibility that exterior twisting forces on the line will dislodge the shield and inner conductors from their respective buses, thereby degrading the connection.

In assembling the junction block, the base and cover are separated. Depending on the configuration to be used, the network line and the drop line, as appropriate, are prepared for assembly. The block can be used for a T-connection, as shown in the drawings, in which case two network line ends and a drop line end are prepared. Alternatively, in the end position of the network line, only one network line end and a drop line end are assembled. If the junction block is employed for splicing, no drop line end is assembled.

A conventional stripper tool is used to remove the outer insulation and with it the conductive sheath from the two severed ends of the line. No special preparation of the braid is required. The network line is forced into the insulation displacement (major) slots of shield bus 42, using a needlenose pliers or other suitable tool to exert the needed force. Shield bus 42 thereby engages shield 16. The drop line is similarly assembled to the block.

The free ends of the inner conductors require no special preparation. According to indicia preferably displayed on the inner surface of base floor 30, the blue insulated conductors of the the lines are forced into any of slots 62 in conductor bus 54; the white insulated conductors are forced into any of slots 62 of conductor bus 56. Cover 28 is then assembled to base 26. Retaining legs 78 are received in slots 76, and ridges 94 engage outer insulation 14 of the lines to secure the lines against twisting caused by external forces. Keepers 68 and 70 overlap the corresponding conductor buses and retain the engaged conductors within slots 62.

If the block is used to terminate the line, no drop line is assembled to it. In this case suitable resistors are used to simulate a full line, as is well understood in the art. One resistor 96 is connected between any of slots 62 in conductor buses 54 and 56; a second resistor is connected between a minor slot 50 or 52 in shield bus 42 and either of the conductor buses.

In an embodiment of the invention suitable for use with communications line having more than two inner conductors, for example, a line having three conductors, an additional conductor bus may be provided in base 26, for example, aligned along the axis of symmetry 74. All of a first color (or otherwise designated class) of conductor are connected together by conductor bus 54; all of a second class are connected together by conductor bus 56; all of the third class of conductor are connected together by the third conductor bus. Further conductors may be accommodated by obvious modification of the junction block disclosed herein, employing the advantageous structures of the invention.

The assembled block is mounted to a building stud by a screw through turret 92. In alternative embodiments, where greater ruggedness is desired, additional assembly screws may be employed.

What is claimed is:

1. For providing splice-in connection to a network line comprising an outer insulation, a shield, and at least two conductors, each conductor being separately enclosed in an insulation layer, a junction box comprising
   a base and cover mutually engageable to define a junction block body in an assembled condition,
   said block in said assembled condition providing at least two line entrance structures connecting the interior and exterior of said block body,
   said base having an interior floor and perimeter wall portions
   said base providing first bus receiving means,
   said block further comprising an electrically conductive shield bus positioned in said first bus receiving means, and providing a plurality of major slots, a said line-entrance structure being aligned with a said major slot, each said major slot being sized to displace the outer insulation and engage the shield of a network line,
   said base floor further providing conductor bus receiving means,
   said block further comprising electrically conductive conductor buses each positioned in said conductor bus receiving means and having an upper edge spaced from said conductor bus receiving means, and providing at least one slot opening from said upper edge, each said conductor bus slot being sized to displace a conductor's insulation layer and engage the conductor of a network line, said block base providing at least two network line receiving slots, said block cover providing at least two corresponding line retaining legs, a said retaining leg being received in a said receiving slot in said block assembled condition to comprise said line entrance structure.

2. For providing splice-in connection to a network line comprising an outer insulation, a shield, and at least two conductors, each conductor being separately enclosed in an insulation layer, a junction box comprising a base and cover mutually engageable to define a junction block body in an assembled condition, said block in said assembled condition providing at least two line entrance structures connecting the interior and exterior of said block body, said base having an interior floor and perimeter wall portions said base providing first bus receiving means, said block further comprising an electrically conductive shield bus positioned in said first bus receiving means, and providing a plurality of major slots, a said line-entrance structure being aligned with a said major slot, each said major slot being sized to displace the outer insulation and engage the shield of a network line, said base floor further providing conductor bus receiving means, said block further comprising electrically conductive conductor buses each positioned in said conductor bus receiving means and having an upper edge spaced from said conductor bus receiving means, and providing at least one slot opening from said upper edge, each said conductor bus slot being sized to displace a conductor's insulation layer and engage the conductor of a network line, said block base providing three line receiving slots, said block cover providing three corresponding line retaining legs, a said retaining leg being received in said receiving slot in said block assembled condition to comprise a said line entrance structure, said retaining legs together with said line receiving slots together defining a polarized assembled position of said cover with respect to said base.

3. The junction block of claim 1 or claim 2, said line receiving slots and said retaining legs providing network line rotation-limiting structure.

4. The junction block of claim 3, said line receiving slots providing a plurality of ridges oriented parallel with the extent of said line-entrance structure, said retaining legs providing a plurality of ridges similarly oriented, said slot ridges and said leg ridges together comprising said rotation-limiting structure.

5. For providing splice-in connection to a network line comprising an outer insulation, a shield, and at least two conductors, each conductor being separately enclosed in an insulation layer, a junction box comprising a base and cover mutually engageable to define a junction block body in an assembled condition, said block in said assembled condition providing at least two line entrance structures connecting the interior and exterior of said block body, said base having an interior floor and perimeter wall portions said base providing first bus receiving means, said block further comprising an electrically conductive shield bus positioned in said first bus receiving means, and providing a plurality of major slots, a said line-entrance structure being aligned with a said major slot, each said major slot being sized to displace the outer insulation and engage the shield of a network line, said base floor further providing conductor bus receiving means, said block further comprising electrically conductive conductor buses each positioned in said conductor bus receiving means and having an upper edge spaced from said conductor bus receiving means, and providing at least one slot opening from said upper edge, each said conductor bus slot being sized to displace a conductor's insulation layer and engage the conductor of a network line, said junction block having three said line entrance structures being generally aligned, wherein said shield bus is generally U-shaped, comprising two leg portions each adjacent one of said generally aligned line entrance structures, and an included portion adjacent said remaining line entrance structure, said portions being of generally equal length, each of said shield bus portions providing on of said bus major slots, wherein said U-shaped shield bus defines an area parallel with the plane of said base floor, effectively enclosed within said shield bus, and two inner conductor buses being positioned in said base conductor bus receiving means to define a point of closest approach between said conductor buses, said point of closest approach being within said effectively enclosed area.

6. For providing splice-in connection to a network line comprising an outer insulation, a shield within the outer insulation, and at least two conductors, each conductor being separately enclosed in an insulation layer and carried within the shield, a junction block comprising a base and a cover mutually engageable to define a junction block body in an assembled condition said block base providing three line receiving slots, said block cover providing three corresponding line retaining legs, a said retaining leg being received in a said receiving slot in said block assembled condition to comprise a line entrance structure connecting the interior and exterior of said block body, two of said line-entrance structures being generally aligned, said retaining legs with said line receiving slots together defining a polarized assembled position of said cover with respect to said base, said base having an interior floor and perimeter wall portions, said base floor providing first bus receiving means, said block further comprising an electrically conductive U-shaped shield bus positioned in said first bus receiving means, said shield bus comprising two leg portions each adjacent one of said generally aligned line entrance structures, and an included portion adjacent said remaining line-entrance structure, said portions being of generally equal length, said shield bus providing three major slots extending vertically away from said base floor, each said major slot being aligned with a said line-entrance structure, each said major slot being sized to displace the outer insulation and engage the shield of a network line, said shield bus defining in said block assembled condition an area effectively enclosed within said shield bus, said base floor further providing conductor bus receiving means, said block further comprising two electrically conductive conductor buses each positioned in said conductor bus receiving means and having an upper edge spaced from said receiving means, and providing at least one slot opening from said upper edge and extending vertically away from said base floor, each said slot being sized to displace the inner insulation and engage the conductor of a network line, said cover having an inner surface, said inner surface providing conductor keepers, generally aligned with said conductor buses in the assembled condition of said block, each said conductor keeper extending towards said base floor by a distance less than the depth of said slot, said two conductor buses being positioned by said conductor bus receiving means to define a point of closest approach between said conductor buses, said point of closest approach being within said effectively enclosed area.

7. The junction block of claim 6, said line receiving slots providing a plurality of ridges oriented parallel with the extent of said line-entrance structure, said retaining legs providing a plurality of ridges similarly oriented, said slot ridges and said leg ridges together comprising line rotation-limiting structure.

8. The junction block of claim 6, said block body having an axis of symmetry in a plane parallel with said base floor, said two aligned line-entrance structures being positioned symmetrically with respect to said axis of symmetry, said bus shield portions being positioned symmetrically with respect to said axis of symmetry, and said conductor buses being positioned symmetrically with respect to said axis of symmetry, in said assembled condition of said block.

9. A junction block for providing connections among a plurality of lines, each line comprising an outer insulating sheath, a conductive shield of predetermined diameter thereunder, and a plurality of conductors therein each separately enclosed in an insulating layer, said junction block comprising a base and a cover mutually engageable to define in an assembled condition a junction block body enclosing an interior space with a floor provided by the base, a top provided by the cover, and a perimeter wall provided cooperatively by the base and cover, said base including a shield bus made from a single piece of sheet metal stock and providing a shield bus wall positioned at right angles to said floor, an edge of said shield bus wall away from said floor having therein a plurality of insulation displacement slots sized to displace the outer insulating sheath of a line and make contact with the conductive shield thereunder, one or more conductor buses, electrically isolated from said shield bus and each other if more than one, each made from a single piece of sheet metal stock and providing a conductor bus wall positioned within said interior space at right angles to said floor, an edge of each said conductor bus wall away from said floor having therein a plurality of insulation displacement slots sized to displace the outer insulating sheath of a conductor and make contact with the conductor therein, said block in assembled condition providing a plurality of line entrance structures providing passage for a line through said perimeter wall while holding said line in place, said structures being sized to fit the outer insulating sheath and being aligned respectively to the plurality of insulation displacement slots in said shield bus.

10. A junction block as claimed in claim 9, said base and cover cooperating to form said line entrance structures.

11. A junction block as claimed in claim 9, said cover having conductor keepers protruding inwards from said top and dimensioned to press, in the assembled condition, against installed conductors to secure them in said insulation displacement slots.

12. A junction block as claimed in claim 9, said base including stiffening structure supporting said shield bus in proximity to said outer insulating sheath displacement slots.

* * * * *